(12) United States Patent
Nielsen et al.

(10) Patent No.: US 10,794,366 B2
(45) Date of Patent: Oct. 6, 2020

(54) METHOD FOR MONITORING AND ASSESSING POWER PERFORMANCE CHANGES OF A WIND TURBINE

(71) Applicant: VESTAS WIND SYSTEMS A/S, Aarhus N (DK)

(72) Inventors: Carsten Krogh Nielsen, Hammel (DK); Sven Jesper Knudsen, Varde (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 280 days.

(21) Appl. No.: 15/771,842

(22) PCT Filed: Nov. 10, 2016

(86) PCT No.: PCT/DK2016/050361
§ 371 (c)(1),
(2) Date: Apr. 27, 2018

(87) PCT Pub. No.: WO2017/088878
PCT Pub. Date: Jun. 1, 2017

(65) Prior Publication Data
US 2019/0063406 A1  Feb. 28, 2019

(30) Foreign Application Priority Data
Nov. 26, 2015 (DK) .................... 2015 70765

(51) Int. Cl.
*F03D 17/00* (2016.01)
*F03D 7/04* (2006.01)
*F03D 9/25* (2016.01)

(52) U.S. Cl.
CPC ............ *F03D 17/00* (2016.05); *F03D 7/046* (2013.01); *F03D 7/048* (2013.01); *F03D 9/257* (2017.02);
(Continued)

(58) Field of Classification Search
CPC ............ F05B 2220/30; F05B 2260/80; F05B 2260/821; F05B 2270/32
See application file for complete search history.

(56) References Cited

U.S. PATENT DOCUMENTS

2011/0224926 A1  9/2011  Morjaria et al.
2012/0209539 A1  8/2012  Kim
(Continued)

FOREIGN PATENT DOCUMENTS

CN  102208050 A  10/2011
EP  2469082 A2  6/2012
(Continued)

OTHER PUBLICATIONS

Chinese Office Action for Application 201680068425.3 dated Apr. 4, 2019.
(Continued)

*Primary Examiner* — Matthew G Marini
(74) *Attorney, Agent, or Firm* — Patterson + Sheridan, LLP

(57) ABSTRACT

A method for monitoring and assessing power performance changes of one or more wind turbines of a wind farm, the method comprising the steps of: for each wind turbine to be monitored, defining a group of reference wind turbines, the group of reference wind turbines comprising two or more wind turbines, operating the wind turbines of the wind farm, while obtaining locally measured wind speeds at each of the wind turbines, during a training period, obtaining the power performance data in relation to the locally measured wind speed for each of the monitored wind turbines, during the training period, for each of the monitored wind turbines, generating a wind speed transfer function establishing a relationship between the locally measured wind speeds at each of the reference wind turbines and the locally measured wind speed at the monitored wind turbine, operating the
(Continued)

wind turbines of the wind farm, while obtaining locally measured wind speeds, at least at the reference wind turbines during one or more test periods following the training period, estimate the wind speed for the monitored wind turbines during the test periods based on the measured wind speeds at the reference wind turbines, and the transfer function generated during the training period for the monitored wind turbine, obtain, power performance data for each of the monitored wind turbines in relation to the estimated wind speed, asses power performance by comparing the power performance data obtained during the test periods with the power performance data obtained during the training period.

18 Claims, 3 Drawing Sheets

(52) U.S. Cl.
CPC ....... *F05B 2220/30* (2013.01); *F05B 2260/80* (2013.01); *F05B 2260/821* (2013.01); *F05B 2260/845* (2013.01); *F05B 2270/32* (2013.01); *F05B 2270/335* (2013.01); *Y02E 10/723* (2013.01)

(56) References Cited

U.S. PATENT DOCUMENTS

| 2013/0073223 | A1 | 3/2013 | Lapira et al. |
| 2015/0308416 | A1* | 10/2015 | Ambekar ............... F03D 9/257 700/287 |
| 2016/0226258 | A1* | 8/2016 | Giertz .................... H02J 3/381 |

FOREIGN PATENT DOCUMENTS

| EP | 2631471 A1 | 8/2013 |
| GB | 2477968 A | 8/2011 |
| WO | 2015077337 A1 | 5/2015 |
| WO | 2017088878 A1 | 6/2017 |

OTHER PUBLICATIONS

PCT Notification of Transmittal of The International Search Report and The Written Opinion of the Internatonal Searching Authority, or the Declaration for Application No. PCT/DK2016/050361 as dated Jan. 19, 2017.
PCT Written Opinion of the International Searching Authority for Application No. PCT/DK2016/050361 dated Nov. 10, 2016.
Danish Patent and Tradmark Office Written Opinion for Application No. PA 2015 70765 dated Jul. 25, 2016.

\* cited by examiner

METHOD FOR MONITORING AND ASSESSING POWER PERFORMANCE CHANGES OF A WIND TURBINE

FIELD OF THE INVENTION

The present invention relates to a method for monitoring and assessing power performance changes of one or more wind turbines of a wind farm. In particular, the method of the invention may be used for detecting if the power performance of a wind turbine degrades over time, either gradually or abruptly.

BACKGROUND OF THE INVENTION

Wind turbines are normally provided with a rotor in the form of a rotatable hub carrying a set of wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Sometimes the power performance of a wind turbine, e.g. in terms of the power produced by the wind turbine, degrades over time. This may, e.g., be due to wear on, malfunction of or breakdown of one or more part of the wind turbine, such as wind turbine blades, gear arrangements, bearings, yaw mechanisms, etc., soiling of the wind turbine blades, etc. In some cases the degradation of the power performance takes place in an abrupt manner, e.g. in the case that the degradation is caused by malfunction or breakdown of a part of the wind turbine. In other cases the degradation of the power performance takes place gradually. This is, e.g., the case when the degradation in power performance is due to soiling of the wind turbine blades.

Examples of events leading to degradation of the power performance of a wind turbine include changes to calibrations of sensors, added extra aerodynamic add-ons on the wind turbine blades, e.g. in the form of vortex generators or gurney flaps, falling off, etc.

If a degradation in power performance of a wind turbine goes undetected, e.g. by the wind turbine control system, the turbine may be operated for a long time at sub-optimal performance. This is, of course, undesirable. However, it is often difficult to detect changes in power performance of a wind turbine, among other things due to natural variations occurring in the available wind data obtained from the wind turbines.

In any event, it is desirable to be able to reliably detect when a degradation of the power performance of a wind turbine occurs, because this will allow the cause of the degradation of the power performance to be quickly at least partly removed, thereby restoring the power performance of the wind turbine.

EP 2 372 479 A1 discloses a method for indicating a performance of a wind turbine. Target performance data is created based at least in part on performance data for one or more wind turbines of interest. Baseline performance data is calculated based at least in part on performance data for a plurality of other wind turbines. The target performance data is compared to the baseline performance data to create a relative performance profile.

DESCRIPTION OF THE INVENTION

It is an object of embodiments of the invention to provide a method for monitoring and assessing power performance changes of one or more wind turbines, the method allowing degradation in power performance of a wind turbine to be reliably detected.

It is a further object of embodiments of the invention to provide a method for monitoring and assessing power performance changes of one or more wind turbines, the method allowing small, but significant, changes in power performance to be detected.

The invention provides a method for monitoring and assessing power performance changes of one or more wind turbines of a wind farm, the method comprising the steps of:
for each wind turbine to be monitored, defining a group of reference wind turbines, the group of reference wind turbines comprising two or more wind turbines,
operating the wind turbines of the wind farm, while obtaining locally measured wind speeds at each of the wind turbines, during a training period,
obtaining the power performance data in relation to the locally measured wind speed for each of the monitored wind turbines, during the training period,
for each of the monitored wind turbines, generating a wind speed transfer function establishing a relationship between the locally measured wind speeds at each of the reference wind turbines and the locally measured wind speed at the monitored wind turbine, based on the locally measured wind speeds obtained during the test periods,
operating the wind turbines of the wind farm, while obtaining locally measured wind speeds, at least at the reference wind turbines during one or more test periods following the training period,
estimate the wind speed for the monitored wind turbines during the test periods based on the measured wind speeds at the reference wind turbines during the test period(s), and the transfer function generated during the training period for the monitored wind turbine,
obtain, during each of the test period(s), power performance data for each of the monitored wind turbines in relation to the estimated wind speed,
compare, for each of the monitored wind turbines, the power performance data obtained during the test periods with the power performance data obtained during the training period, and
assessing power performance for each of the monitored wind turbines, based the comparison.

Thus, the present invention relates to a method for monitoring and assessing power performance changes of one or more wind turbines of a wind farm, regardless of whether such power performance changes take place in an abrupt or in a gradual manner.

In the present context the term 'wind farm' should be interpreted to mean a group of wind turbines, arranged within a site, i.e. a well-defined geographical area. The wind farm may be arranged on-shore or off-shore. The wind turbines of a wind farm are sometimes at least partly controlled dependently of each other. Wind farms are also sometimes referred to as 'wind power plants' or 'wind parks'.

According to the method of the invention, for each wind turbine to be monitored, a group of reference wind turbines are defined. Each group of reference wind turbines comprises two or more wind turbines of the wind farm. The monitored wind turbines could be any number of wind turbines of the wind farm, including all of the wind turbines of the wind farm.

When defining the group of reference wind turbines for a given monitored wind turbine, a number of wind turbines of the wind farm, other than the monitored wind turbine, are selected and included in the group of reference wind turbines. This could, e.g., be all of the other wind turbines of the wind farm, or it could be a suitable subset of the wind turbines of the wind farm. For instance, only wind turbines being arranged in the vicinity of the monitored wind turbine may be selected and/or only wind turbines of the same type as the monitored wind turbine. Alternatively or additionally, some of the wind turbines of the wind turbine may be ruled out as reference wind turbines with respect to any of the monitored wind turbines, e.g. because they are known to behave in a manner which is not representative for a typical wind turbine of the wind farm, e.g. due to special conditions occurring at a part of the site where such a wind turbine is arranged, e.g. in terms of terrain, wind wake, turbulence, wind shear, etc., or simply because the wind turbines are of a different type than the other wind turbines of the wind farm.

A given wind turbine may form part of the group of reference wind turbines with respect to two or more monitored wind turbines and/or a monitored wind turbine could form part of the group of reference wind turbines with respect to one or more other monitored wind turbines.

The wind turbines of the wind farm may be operated, in a normal manner, while obtaining locally measured wind speeds at each of the wind turbines, during a training period. The locally measured wind speeds may, e.g., be obtained by means of measurement devices, such as anemometers, arranged at or near the wind turbines.

The training period could be a relatively long period of several months or a year, or even longer.

Furthermore, power performance data for the monitored wind turbines is obtained during the training period. Such power performance data is used for comparison with the power performance measured in the test period in order to establish changes in the power performance of the monitored wind turbines. The power performance is obtained in relation to the locally measured wind speed at each of the monitored wind turbines.

For each of the monitored wind turbines, a transfer function is generated during the training period. The transfer function establishes a relationship between locally measured wind speeds at each of the reference wind turbines and locally measured wind speeds at the monitored wind turbine. Thus, the transfer function for a given monitored wind turbine can be used for estimating and/or calculating the wind speed which is measured locally at the monitored wind turbine, based on locally measured wind speeds at the reference wind turbines. Preferably, the transfer function is generated while the wind turbines are operated in a normal manner.

The transfer function reflects an actual relationship between the measured wind speeds at the reference wind turbines, and the wind speed of the monitored wind turbine, during the training period, i.e. before any degradation of the power performance of the monitored wind turbine may be expected.

It may be an advantage that the transfer functions for each of the monitored wind turbines are generated based on locally measured wind speeds at the reference wind turbines, because this allows separate measurement stations, e.g. in the form of metmasts, for providing reference wind speed data to be avoided. Furthermore, since the transfer function relies on measured wind speeds from a plurality of measurement devices, reliable measurements can be obtained, even if one or more of the measurement devices malfunctions or is unavailable. Finally, a statistically reliable result is obtained.

After the training period, the power performance data is obtained for a given monitored wind turbine during a subsequent test period, which may constitute a single test period, or it may be divided into two or more subsequent test periods. During the test periods any changes in power performance which are caused by changes in the locally measured wind speed at the monitored wind turbine are filtered out, allowing the real power performance changes to be detected. This is due to the use of the transfer function to estimate the wind speed at the monitored wind turbine instead of using the locally measured wind speed at the monitored wind turbine.

Next, the wind speed is established locally at the reference wind turbines during the test period. The transfer function is used to estimate the wind speeds at the monitored wind turbines. For each of the monitored wind turbines, the power performance data is then obtained in relation to the estimated wind speeds at the monitored wind turbines.

Power performance data may be the power output from a monitored wind turbine at a given estimated wind speed or it may be a mean (e.g. weighted) of a plurality of power outputs. The power performance data in relation the estimated wind speed may be determined by taking the integral of the power curve determined in relation to the estimated wind, for example from cut-in wind speed to nominal wind speed. This power curve represents the power output of the monitored wind turbine as a function of estimated wind speeds.

In the test period the wind turbines may be operated on the basis of the locally measured wind speed, for both the reference and the monitored wind turbines. But with regards to determining the power performance data for the monitored wind turbines the estimated wind speed is used.

The power performance of the monitored wind turbine, during the test period can now be compared to the power performance of the monitored wind turbine as measured during the test period. Power performance changes for each of the monitored wind turbines are finally assessed, based on the comparison. In particular, it may be determined if the power performance of a monitored wind turbine is degraded in the case that the comparison reveals that the power performance of this wind turbine is lower than expected. Subsequently, actions may be taken in order to remove the cause of the power performance degradation, thereby once again restoring the power performance of the wind turbine.

Accordingly, the method of the invention allows power degradation of a monitored wind turbine to be quickly and reliably detected, because the impact that degradation of the monitored wind turbine may have on the locally measured wins speed by the wind turbine itself is removed by use of the transfer function and the locally measured wind speeds at the reference wind turbines. Thereby even gradual changes or small changes in the power performance of a wind turbine can be detected and reacted upon, thereby preventing that the monitored wind turbine is operated at sub-optimal power performance for a long period of time. Furthermore, the method of the invention allows real changes in power performance to be distinguished from changes in power production which are due to other circumstances, such as changes in wind conditions, weather conditions, seasonal changes, etc.

It is further an advantage that the transfer functions for each of the monitored wind turbines are generated based on locally measured wind speeds at the reference wind turbines, because this allows separate measurement stations, e.g. in the form of metmasts, for providing reference wind speed data to be avoided. Furthermore, since the transfer function relies on measured wind speeds from a plurality of measurement devices, reliable measurements can be obtained, even if one or more of the measurement devices malfunctions or is unavailable. Finally, a statistically reliable result is obtained.

It is to be understood that the training period and test period(s) are relative such that the time interval which constitutes at test period, for a previous training period, can be a training period for a subsequent power performance changes assessment bases on a subsequent test period.

In an embodiment, the assessed power performance changes of at least two monitored wind turbines are compared. This can be done to establish if there are changes which affect more turbines in the wind park. For example, if multiple wind turbines in a park experiences the same decrease in power performance it could be due to ice formations on the blades. Ice formations on the blades will affect the power performance of all the turbines at substantially the same time, although the impact on the power performance in each wind turbine may differ.

The step of generating a transfer function may comprise training a learning algorithm. According to this embodiment the transfer functions for the respective monitored wind turbines are generated gradually, during the training period, and the transfer functions are obtained on the basis of empirical wind speed data, collected during a time period which is sufficiently long to provide a statistically reliable foundation for estimating local wind speeds at the reference wind turbines.

Alternatively or additionally, the step of generating a transfer function may be performed using a linear regression method.

The object of the transfer function for a given monitored wind turbine is to be able to estimate or predict the local wind speed at the monitored wind turbine, based on locally measured wind speeds at the reference wind turbines of the group of reference turbine for that monitored wind turbine. The transfer functions for the I'th monitored wind turbine may advantageously be of the form:

$$\hat{v}_i = f_i(X_R),$$

where $\hat{v}_i$ denotes the estimated wind speed, $f_i$ is a predictor function for the i'th monitored wind turbine, and $x_R$ represents the reference wind speed data obtained from the reference wind turbines. Assuming that there are $n_R$ reference wind turbines, a linear regression of wind speeds on reference wind speeds, obtaining $n_R$ fitted linear regression functions may, e.g., be created. A power performance data score may then be synthesized as the average of the predicted values:

$$\hat{v}_i = \frac{1}{n_R} \sum_{j \in R} (a_{ij} + b_{ij} v_{ij}),$$

where $a_{ij} + b_{ij} v_{ij}$ denotes the j'th reference prediction at time t.

As an alternative, multiple regression of the monitored wind speed, using all reference wind turbine wind speeds as regressors, may be used.

The number of monitored wind turbines may be substantially equal to the number of wind turbines in the wind farm and the number of reference turbines for each monitored wind turbine may be substantially equal to the number of wind turbines in the wind farm.

Some of the wind turbines of the wind farm may be omitted from the process. For instance, some of the wind turbines of the wind farm may for some reason produce wind speed measurements and/or power performance data which are not representative for the wind turbines of the wind farm in general. Thereby, data obtained by such wind turbines may in fact disturb or degrade the generated transfer functions, rather than contributing to the statistical reliability of the transfer function, and a more reliable transfer function can be obtained if such wind turbines are omitted. The omitted wind turbines could, e.g., be arranged in parts of the site of the wind farm where special conditions occur, e.g. in terms of terrain, wind wake, turbulence, wind shear, etc. Alternatively or additionally, the omitted wind turbines may be of a different type than the monitored wind turbines.

The estimated wind speeds, obtained by means of locally measured wind speeds at each of the reference wind turbines and the previously generated transfer functions, may be obtained using a synthesis function reducing the estimates for each reference wind turbine to each monitored wind turbine to one estimate. The synthesis function could, e.g., be a simple average, median, geometric mean or another simple aggregator.

The synthesis function may be an average or a weighted average per wind speed interval. In the case that the synthesis function is a weighted average, the weights could, e.g., be calculated or selected based on the distances between each of the reference wind turbines and the monitored wind turbine in question. For instance, the weights could be (1/distance) or (1/distance*the uncertainty of the transfer function). Thereby the wind speed measurements from the reference wind turbines which are arranged close to the monitored wind turbine in question are given more weight than the wind speed measurements from the reference wind turbines which are arranged far from the monitored wind turbine. However, a simple average may instead be used, or the weights may be calculated or selected in another manner, e.g. taking specific conditions at the site, such as wind wake, expected turbulence, expected wind shear, hills and valleys, etc., into account.

For instance, the synthesis function may include Kriging as a method of interpolation. In this case a surface is fitted to the wind speed data, and an interpolation to the location of interest, i.e. the location of the monitored wind turbine, is performed. Ordinary Kriging is basically a weighted average over spatially distributed data, where the weights are estimated by spatial correlation. Universal Kriging assumes a polynomial surface instead of the average, and thin plate splines versions also exist. The synthesis method may, alternatively, be in the form of a regression learning algorithm or a spatio-temporal dynamical model.

The step of assessing power performance changes may comprises obtaining annual energy production data for the monitored turbines in the training and test period(s) and comparing changes in annual energy production data.

The annual energy production for a wind turbine represents the amount of energy which the wind turbine is able to produce during a year. Since energy production of a wind turbine may very well vary from one season to another, the annual energy production provides an appropriate measure for the level of energy which an owner of the wind turbine may expect the wind turbine to produce.

Alternatively or additionally, the step of assessing power performance changes of the monitored wind turbines may include generating power curves, preferably by integration of at least part of the power curve.

The transfer function may further be calculated per a number of different wind direction sectors. The performance of a given wind turbine in a wind farm may vary significantly, depending on the direction of the wind, e.g. due to wind wake effect, variations in the landscape, etc. It may therefore be advantageous to the take the direction of the wind into account when generating the transfer function.

The point in time at which a change in power performance of at least one monitored wind turbine occurred may be displayed by displaying a measure of comparison—e.g. annual energy production—for a sequence of test periods, and determining the period for which the change occurred. It is advantageous to take the delta between an initial annual estimated production (e.g. based on the training period) and annual estimated production calculated in each of the test periods.

Substantially all of the wind turbines of the wind farm may be monitored wind turbines. According to this embodiment, the power performance of substantially all of the wind turbines of the wind farm may be assessed, using the method of the invention. However, some of the wind turbines of the wind farm may be omitted.

BRIEF DESCRIPTION OF THE DRAWINGS

The invention will now be described in further detail with reference to the accompanying drawings in which.

DETAILED DESCRIPTION OF THE DRAWINGS

Figure 1B:
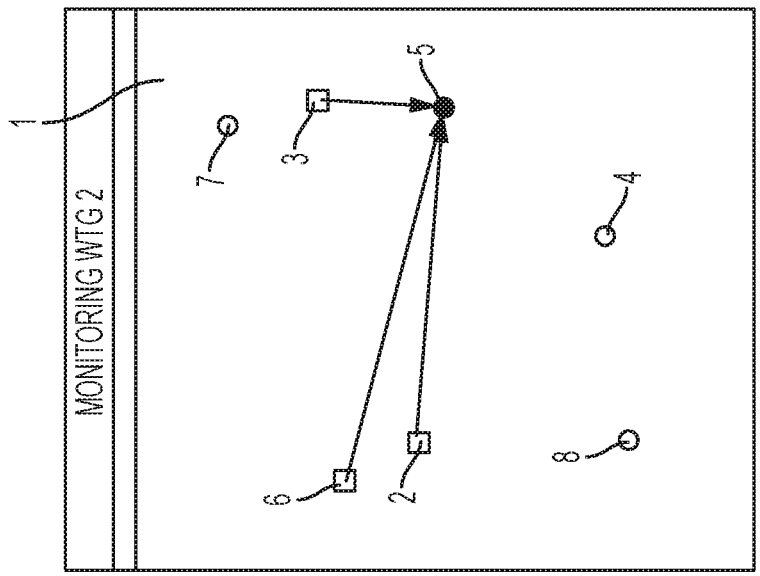
FIGS. 1a and 1b show a layout of a wind farm, illustrating groups of reference wind turbines for two different monitored wind turbines.
Figure 1A:
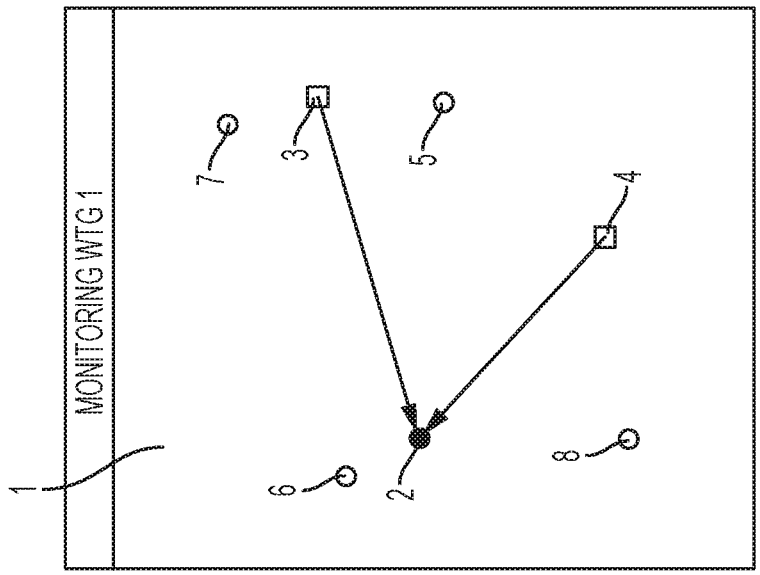

FIGS. 1a and 1b show a layout of a wind farm 1 comprising a number of wind turbines, seven of which are shown. Potentially, each of the wind turbines of the wind farm 1 may be a monitored wind turbine, and any of the wind turbines of the wind farm 1 may form part of a group of reference wind turbines for one or more of the other wind turbines of the wind farm 1.

In FIG. 1a, wind turbine 2 is illustrated as a monitored wind turbine, and wind turbines 3 and 4 are illustrated as reference wind turbines for the monitored wind turbine 2. Wind turbines 5, 6, 7 and 8 do not form part of the group of reference wind turbines for the monitored wind turbine 2, and these wind turbines 5, 6, 7, 8 are therefore labelled as 'not used' in FIG. 1a.

In FIG. 1b, wind turbine 5 is illustrated as a monitored wind turbine, and wind turbines 2, 3 and 6 are illustrated as reference wind turbines for the monitored wind turbine 5. Wind turbines 4, 7 and 8 do not form part of the group of reference wind turbines for the monitored wind turbine 5, and these wind turbines 4, 7, 8 are therefore labelled as 'not used' in FIG. 1b.

Thus, wind turbine 2 is a monitored wind turbine, but is also a reference wind turbine with respect to wind turbine 5. Wind turbine 3 is a reference wind turbine with respect to wind turbine 2 as well as with respect to wind turbine 5. Wind turbines 7 and 8 are neither illustrated as monitored wind turbines, nor as reference wind turbines. This could, e.g., be because specific circumstances regarding wind turbines 7 and 8 make them unsuitable for use as monitored wind turbines as well as for use as reference wind turbines. For instance, special wind or terrain condition may be present in the parts of the wind farm 1 where these wind turbines 7, 8 are located. Or they may be of a different type than the other wind turbines of the wind farm 1.

When the groups of reference wind turbines have been defined for each of the wind turbines to be monitored, a training period is initiated, in which the wind turbines 2, 3, 4, 5, 6, 7, 8 of the wind farm 1 are operated in a normal manner. During the training period, locally measured wind speeds are obtained at each of the wind turbines 2, 3, 4, 5, 6, 7, 8. Furthermore, power performance data is obtained from each of the monitored wind turbines.

Then, also during the training period, a transfer function is generated for each of the monitored wind turbines. The transfer function for a given monitored wind turbine establishes a relationship between locally measured wind speeds at each of the reference wind turbines of the monitored wind turbine and the locally measured wind speed at the monitored wind turbines. Thus by use of the transfer function and the locally measured wind speeds at the reference wind turbines it is possible to estimate the wind speed at the monitored wind turbines.

Thus, the transfer function for wind turbine 2 establishes a relationship between the locally measured wind speeds at wind turbines 3 and 4 and the locally measured wind speed for wind turbine 2. Similarly, the transfer function for wind turbine 5 establishes a relationship between the locally measured wind speeds at wind turbines 2, 3 and 6 and the locally measured wind speed for wind turbine 5.

Following the training period, the wind turbines 2, 3, 4, 5, 6, 7, 8 are once again operated in a normal manner, during one or more test periods. During the test period(s), locally measured wind speeds are obtained, at least at the reference wind turbines, and power performance data is obtained for each of the monitored wind turbines, where the estimated wind speed is used when determining the power performance. Thereby the power performance is established in relation to the estimated wind speed.

Finally, for each monitored wind turbine, the power performance data obtained during the test period(s) is compared to the power performance obtained during the training period. Accordingly, the comparison reveals whether or not the monitored wind turbines perform in an expected manner. Accordingly, the power performance for each of the monitored wind turbines is assessed, based on the comparison.

Figure 2:
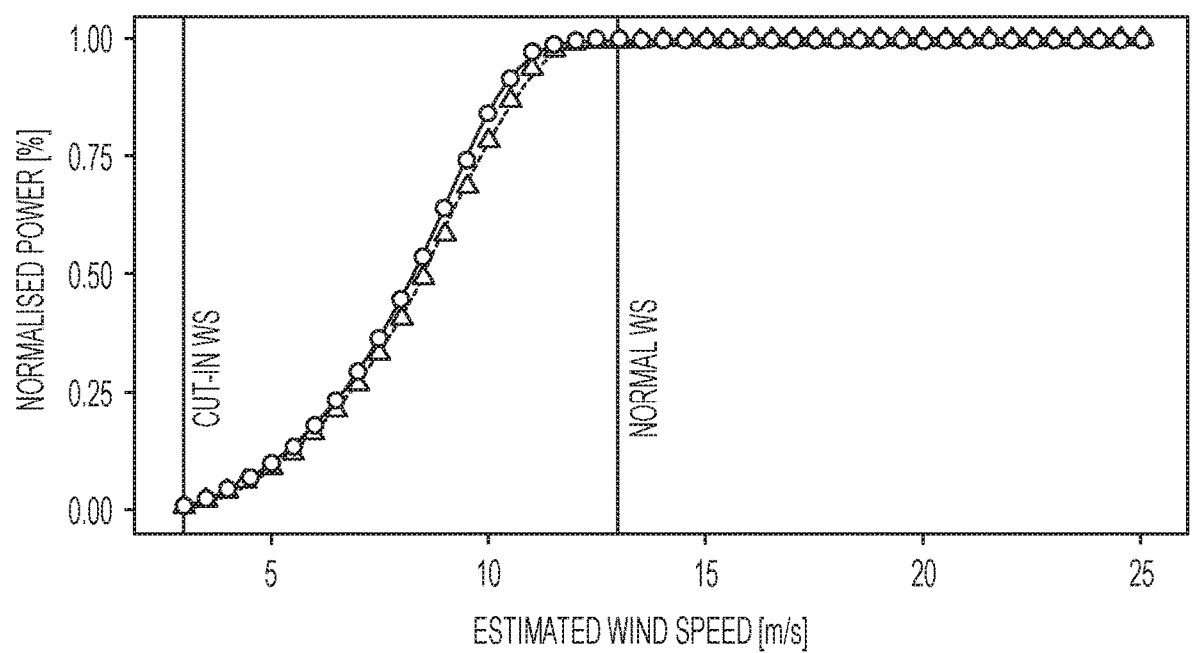
FIG. 2 shows power curves for the training and test period.

FIG. 2 shows measured power curves during training and test period for a monitored wind turbine.

The curve marked with circles represents the power curved of the monitored wind turbine during the training period. It is noted that the locally measured wind speed is substantially equal to the predicted wind speed in the training period.

The curve marked with triangles is a power curve for the monitored wind turbine during a test period. The curve is determined by measuring the power output from the monitored wind turbine at different estimated wind speeds. Wherein the estimated wind speed is determined by use of the transfer function and the wind speed measured locally at the reference wind turbines.

In order to establish the power performance of the monitored wind turbine the power curve for the training period and test period are integrated from cut-in wind speed to the nominal wind speed, respectively. Thus, the power performance data in relation to the locally measured wind speed during the training period is taken to be the integral of the power curve for the monitored wind turbine during the training period (the curve marked with circles) and the power performance data in relation to the estimated wind speed during the test period is taken to be the integral of the power curve for the monitored wind turbine during the test period (the curve marked with triangles).

From FIG. 2 it appears that, the power performance during the test period is smaller than the power performance from the training period. Accordingly, comparing the two curves reveals that the power performance of the monitored wind turbine is lower than expected, i.e. the power performance of the monitored wind turbine is, for some reason, degraded.

Figure 3:
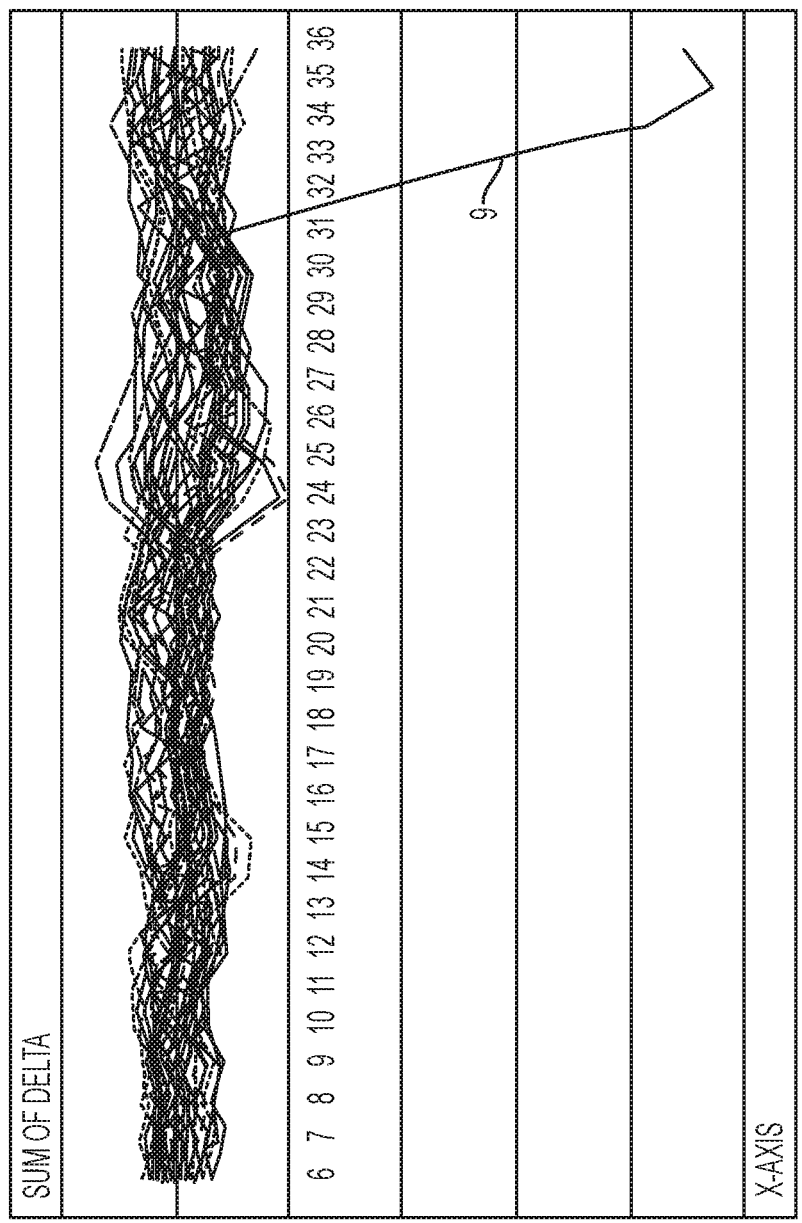
FIG. 3 is a graph showing changes in the power performance for a number of monitored wind turbines.

FIG. 3 is a graph showing annual estimated power performance from a plurality of monitored wind turbines during test periods numbered 6 to 36. The annual estimated power performance for each monitored wind turbine is normalised by the annual estimated power performance as determined during the training period. The annual estimated power performance during the training period is power performance data in relation to the locally measured wind speeds during the training period and annual estimated power performance during the test period is power performance data in relation to the estimated wind speeds during the test period.

Thus, the graph shows the comparison of the annual estimated power performance (power performance data) in the training period and the test period. In representing the data as shown in FIG. 3 the power performance data for the different monitored wind turbines can easily be compared.

It can be seen that, for most of the monitored wind turbines, the energy production from the training period is substantially identical to the annual estimated energy production during the test periods. However, for one of the wind turbines, represented by curve 9, a significant decrease in annual energy production as compared to the annual energy production during the training period occurs at the end of one of the test periods. Accordingly, from the graph it can be established that this particular wind turbine is operating at degraded power performance, and the point in time at which the degradation started can be established. Furthermore, since none of the other wind turbines seem to be affected, it can be concluded that the problem is isolated to that specific wind turbine.

The invention claimed is:

1. A method for monitoring and assessing power performance changes of one or more wind turbines of a wind farm, the method comprising:
    for each wind turbine to be monitored, defining a group of reference wind turbines, the group of reference wind turbines comprising two or more wind turbines,
    operating the wind turbines of the wind farm, while obtaining locally measured wind speeds at each of the wind turbines, during a training period,
    obtaining the power performance data in relation to the locally measured wind speed for each of the monitored wind turbines, during the training period,
    for each of the monitored wind turbines, generating a wind speed transfer function establishing a relationship between the locally measured wind speeds at each of the reference wind turbines and the locally measured wind speed at the monitored wind turbine, based on the locally measured wind speeds obtained during the training period,
    operating the wind turbines of the wind farm, while obtaining locally measured wind speeds, at least at the reference wind turbines during one or more test periods following the training period,
    estimating the wind speed for the monitored wind turbines during the test periods based on the measured wind speeds at the reference wind turbines during the test period(s), and the transfer function generated during the training period for the monitored wind turbine,
    obtaining, during each of the test period(s), power performance data for each of the monitored wind turbines in relation to the estimated wind speed,
    comparing, for each of the monitored wind turbines, the power performance data obtained during the test periods with the power performance data obtained during the training period, and
    assessing power performance for each of the monitored wind turbines, based on the comparison.

2. A method according to claim 1, where assessing power performance changes comprises obtaining annual energy production data for the monitored turbines in the training and test period(s) and comparing changes in annual energy production data.

3. A method according to claim 2, wherein generating a transfer function comprises generating transfer functions for one or more wind direction sectors.

4. A method of claim 3, further comprising determining a point in time at which a change in power performance of at least one monitored wind turbine occurred.

5. A method according to claim 4, further comprising comparing assessed power performance changes of at least two monitored wind turbines.

6. A method according to claim 2, further comprising comparing assessed power performance changes of at least two monitored wind turbines.

7. A method according to claim 2, wherein generating a transfer function comprises training a learning algorithm.

8. A method according to claim 2, wherein generating a transfer function is performed using a linear regression method.

9. A method according to claim 2, wherein the number of monitored wind turbines is substantially equal to the number of wind turbines in the wind farm and the number of reference turbines for each monitored wind turbine is substantially equal to the number of wind turbines in the wind farm.

10. A method according to claim 2, wherein the estimated wind speeds, obtained from locally measured wind speeds at each of the reference wind turbines and the previously generated transfer functions, are obtained using a synthesis function reducing the estimates for each reference wind turbine to a monitored wind turbine to one estimate.

11. A method according to claim 1, wherein generating a transfer function comprises generating transfer functions for one or more wind direction sectors.

12. A method according to claim 1, further comprising determining a point in time at which a change in power performance of at least one monitored wind turbine occurred.

13. A method according to claim 1, further comprising comparing assessed power performance changes of at least two monitored wind turbines.

14. A method according to claim 1, wherein generating a transfer function comprises training a learning algorithm.

15. A method according to claim 1, wherein generating a transfer function is performed using a linear regression method.

16. A method according to claim 1, wherein the number of monitored wind turbines is substantially equal to the number of wind turbines in the wind farm and the number of reference turbines for each monitored wind turbine is substantially equal to the number of wind turbines in the wind farm.

17. A method according to claim 1, wherein the estimated wind speeds, obtained from locally measured wind speeds at each of the reference wind turbines and the previously generated transfer functions, are obtained using a synthesis function reducing the estimates for each reference wind turbine to a monitored wind turbine to one estimate.

18. A method for monitoring and assessing power performance changes of a plurality of wind turbines of a wind farm, the method comprising:
for each wind turbine of the plurality to be monitored, defining a group of reference wind turbines comprising two or more wind turbines of the plurality;
during a training period:
operating the plurality of wind turbines while obtaining locally measured wind speeds at each of the plurality of wind turbines,
obtaining the power performance data in relation to the locally measured wind speed for each of the monitored wind turbines, and
for each of the monitored wind turbines, generating a wind speed transfer function establishing a relationship between the locally measured wind speeds at each of the reference wind turbines and the locally measured wind speed at the respective monitored wind turbine, based on the locally measured wind speeds;
during a plurality of periods:
operating the plurality of wind turbines, while obtaining locally measured wind speeds at least at the reference wind turbines,
estimating the wind speed for the monitored wind turbines based on the locally measured wind speeds at the reference wind turbines and the transfer function, and
obtaining power performance data for each of the monitored wind turbines in relation to the estimated wind speed;
comparing, for each of the monitored wind turbines, the power performance data obtained during the plurality of test periods with the power performance data obtained during the training period; and
assessing power performance for each of the monitored wind turbines, based on the comparison.

* * * * *